June 20, 1961 — R. F. WILLIAMS — 2,989,074
VALVE FOR COMPRESSORS
Filed March 28, 1957

INVENTOR.
RAYMOND F. WILLIAMS
BY
Charles W. Welter
ATTORNEY

United States Patent Office 2,989,074
Patented June 20, 1961

2,989,074
VALVE FOR COMPRESSORS
Raymond F. Williams, Quincy, Ill., assignor to Gardner-Denver Company, Quincy, Ill., a corporation of Delaware
Filed Mar. 28, 1957, Ser. No. 649,187
3 Claims. (Cl. 137—516.21)

This invention relates to valves for compressors and the like and more particularly to valves of the plate type adapted for use in high speed gas compressors.

In the use of high speed compressors of the reciprocating type, it is necessary to have fast acting discharge valves. One way to speed-up the action of these valves is to reduce the weight of the movable valve operating element. Another way is to shorten the lift or travel of the valve element between its seats.

Accordingly, it is an object of this invention to provide a valve body having valve seating means formed thereon so that a thin, light weight valve disc may coact properly therewith without bending or otherwise damaging the disc.

It is a further object of this invention to provide a valve body formed so that with a relatively low lift, a relatively large volume of gas for efficient operation of the compressor may pass through the valve.

Further objects and advantages of this invention will become apparent from the following specification and the accompanying drawings in which.

Figure 1:
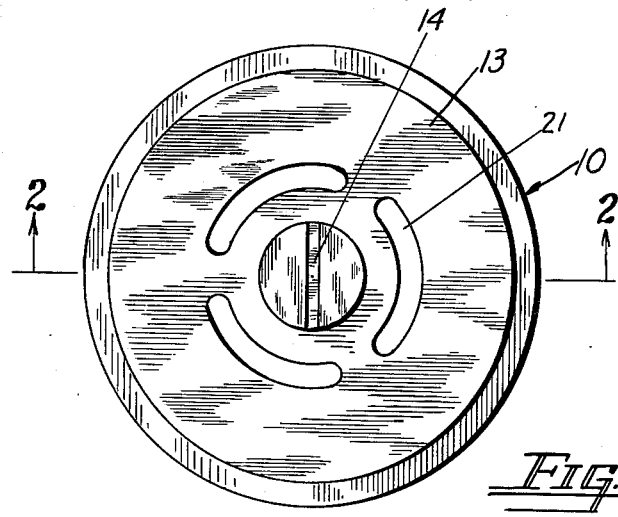
FIG. 1 is a top view of a plate valve embodying a lower valve body in accordance with the invention herein disclosed.

Referring to the drawings, the numeral 10 generally indicates a plate type valve comprising a lower valve body 11, a valve plate 12 and an upper valve body 13. The lower valve body 11 and the upper valve body 13 are cylindrical in shape and are held together by a screw or bolt 14 which extends axially through the upper valve body and is threaded into the lower valve body.

The lower valve body 11 is provided with a multiplicity of closely spaced, annularly disposed ports 15 which are elongated in a direction radially or outwardly from the axis of the valve body. One end surface of the lower valve body 11 is relieved to provide a plurality of integral raised bosses or ridges 16 disposed about the perimeter of each port and narrow, radially extending passageways or ducts therebetween, thus forming individual valve seat surfaces for each port.

Figure 2:
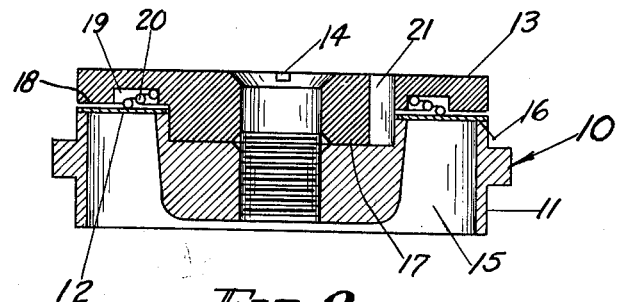
FIG. 2 is a transverse sectional view along the line 2—2 of FIG. 1.

The movable valve plate 12 is shown as a flat ring preferably of thin but flexible material, such as heat treated alloy steel, which in one position, as shown in FIG. 2, bears against the stationary valve seat surfaces 16 to close the ports 15.

The upper valve body 13 is more or less conventional in design and is provided with a portion of reduced diameter 17 creating a shoulder 18 which acts as a bumper for the valve plate 12. An annular recess 19 is formed in the shoulder to receive a coil spring 20 which serves to urge the valve plate 12 towards the valve seats 16. The portion of reduced diameter fits within the cylindrical area created by the plurality of valve seats 16 to engage the lower body member 11. A plurality of segmental ports 21 extend through the upper valve body 13 and lie just within the periphery of the reduced diameter portion to define recesses or ducts in this portion. The ports 21 serve to conduct pressure fluid, such as compressed air, from the ports 15 to an air receiver, not shown, when the valve 12 is open.

It will be obvious that, in the operation of an air compressor utilizing a pressure fluid discharge valve as hereinbefore described, the air compressed by a reciprocating piston in the cylinder of a compressor will cause the valve plate 12 to raise or lift from its seats 16 against the pressure of the spring 20 allowing air to pass to the ports 21 and thence to the conventional air receiver. As the compressor piston returns after compressing a volume of air, the spring 20 will return the valve plate 12 to yielding engagement with seats 16 until the next compression stroke of the piston. The valve plate 12 is further forced against the seats 16 by pressure exerted thereon by compressed air above the valve plate.

It is a trend today in industry to use higher speeds in compressor operation whereby the performance and capacity of compressors can be improved without increasing their size. It is not uncommon for compressors to run at 1750 revolutions per minute which is approximately twice the operating speed that was generally used a few years ago.

The valve hereinbefore described is peculiarly adapted for use in high speed compressors. Because of the multiplicity of closely spaced seats 16 surrounding the radially elongated ports 15, the valve plate 12 can be considerably thinner and lighter than valve plates heretofore used which had to withstand the same operating pressures but with considerably less supporting valve seat area, and with greater beam loading forces due to greater distances between supporting seat points. In fact, it has been discovered by experimentation that a valve plate of .010 to .020 inch thickness will withstand the operating conditions of the valve structure herein described whereas in using conventional discharge valves having relatively widely spaced, large segmental ports in their lower valve bodies the valve plate thickness required to prevent damaging deformation thereof was .060 inch or thereabouts.

In order to increase the volume of gas exhausted through a valve being supplied with gas at a substantially constant pressure, the area of the orifice or passageway through the valve must be increased. In conventional gas discharge valves having defined valve seats, the effective area of the discharge orifice may be computed by multiplying the total length of those portions of the perimetric length of the respective valve seats which are open to discharge times the maximum lift distance of the valve disc. The product of these lengths will be hereinafter referred to as lift area.

Figure 3:
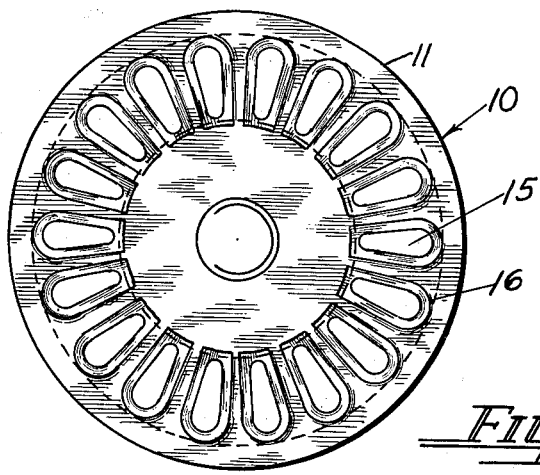
FIG. 3 is a top view of the valve with the upper valve body removed and the valve plate indicated by dotted lines to show the construction of the novel lower valve body of this invention.

Since the lift distance for a dischage valve required to operate at or near 1750 revolutions per minute is limited to a fixed maximum value, the above-defined lift area may be increased only by correspondingly increasing the total perimetric length of the valve seats which are open to discharge. From the foregoing, it will be apparent that the valve seating means 16, constructed and arranged in accordance with the teachings of the present invention, provide substantially maximum lift area for a given lift distance of valve plate 12. More particularly, a great number of discharge ports 15 may be closely spaced and their individual perimeters increased because of their elongated configuration, as illustrated in FIG. 3. Furthermore, in operation the gas entering ports 15 is discharged in all directions between the bosses 16 and the raised valve plate 12, and not solely in an outward and inward radial direction. The narrow ducts separating the bosses 16 provide passages leading to the outer peripheral edge of the face of lower valve body 11 for conducting gas discharge between adjacent bosses toward said peripheral edge.

It has been shown by experiment that a total valve lift of .020 to .030 inch is sufficient to properly handle the volume of air passing through the discharge valve herein described. In conventional valves of the same diameter the lift necessary to handle the air volume has been approximately .090 inch.

As compared to conventional valves of the same diameter, the ratio of volumetric discharge capacity to lift distance of the valve herein described is greatly increased. Because of the lighter weight valve plate made possible by the improved seat construction, and the lower lift requirement, a faster acting valve is obtained.

It will be obvious to one skilled in the art of compressor valves that variations and modifications of the structure herein described may be devised which will fall within the scope of the invention claimed.

I claim as my invention:

1. In a low lift pressure fluid discharge valve having a relatively large volumetric discharge capacity, including a stationary valve body member having a multiplicity of closely spaced, annularly disposed, discharge ports extending therethrough, a thin, annular valve plate adapted for limited lifting action with respect to an end face of said valve body member, and means normally urging said valve plate into yielding engagement with said valve body, the improvement comprising: seating means for said valve plate constructed to provide supporting surfaces which are of sufficient total area and are sufficiently closely spaced to prevent damaging deformation of said thin valve plate due to fluid pressure acting thereon, and said seating means being constructed to further provide substantially maximum lift area for said discharge valve for a limited lift distance of said valve plate; said seating means comprising bosses extending beyond said end face and disposed about the perimeter of individual discharge ports with adjacent bosses being spaced in close proximity to one another to define narrow passages therebetween opening toward the peripheral edge of said end face.

2. In a low lift pressure fluid discharge valve having a relatively large volumetric discharge capacity including a stationary valve body member having a multiplicity of closely spaced, annularly disposed, elongated discharge ports extending therethrough, a thin, annular valve plate adapted for limiting lifting action with respect to an end face of said valve body member, and means normally urging said valve plate into yielding engagement with said valve body, the improvement comprising: seating means for said valve plate constructed to provide supporting surfaces which are of sufficient total area and are sufficiently closely spaced to prevent damaging deformation of said thin valve plate due to fluid pressure acting thereon, and said seating means being constructed to further provide substantially maximum lift area for said discharge valve for a limited lift distance of said valve plate; said seating means comprising integrally formed bosses extending beyond said end face and disposed about the perimeter of individual discharge ports with adjacent bosses being space in close proximity to one another to define narrow, radially extending ducts therebetween, opening toward the peripheral edge of said end face.

3. In a low lift pressure fluid discharge valve having a relatively large columetric discharge capacity, in combination: a lower cylindrical valve body having a multiplicity of ports opening from one face thereof, said port openings being annularly disposed in close proximity to one another and each port opening being elongated in a radial direction; a raised boss surrounding each of said port openings to provide an elongated valve seat therefor, said seats being closely spaced from each other to define narrow, radial passages therebetween for flow of pressure fluid discharged from said ports; an upper valve body having a lower cylindrical portion dimensioned to lie within said valve seats; a thin annular valve plate surrounding said cylindrical portion for engaging the upper face of said seats to close said ports; resilient means for normally urging said valve plate against said valve seats; and said bosses being adapted to support said thin valve plate at closely spaced intervals in a seated condition, and to coact with said valve plate in an unseated condition to provide substantially maximum lift area for discharge of pressure fluid through said valve.

References Cited in the file of this patent

UNITED STATES PATENTS

| | | |
|---|---|---|
| 790,961 | Holtzmann | May 30, 1905 |
| 955,018 | Twiggs | Apr. 12, 1910 |
| 1,677,056 | Small | July 10, 1928 |
| 2,140,328 | Mozier | Dec. 13, 1938 |
| 2,158,351 | Ames | May 16, 1939 |

FOREIGN PATENTS

| | | |
|---|---|---|
| 141,123 | Germany | May 6, 1903 |
| 390,531 | France | July 31, 1908 |
| 860,126 | France | Sept. 24, 1940 |